(12) United States Patent
Ui

(10) Patent No.: US 12,225,902 B2
(45) Date of Patent: Feb. 18, 2025

(54) HERBICIDE COMPOSITION

(71) Applicant: KAO CORPORATION, Tokyo (JP)

(72) Inventor: Takahito Ui, Wakayama (JP)

(73) Assignee: KAO CORPORATION, Tokyo (JP)

(*) Notice: Subject to any disclaimer, the term of this patent is extended or adjusted under 35 U.S.C. 154(b) by 904 days.

(21) Appl. No.: 17/284,588

(22) PCT Filed: Oct. 30, 2019

(86) PCT No.: PCT/JP2019/042511
§ 371 (c)(1),
(2) Date: Apr. 12, 2021

(87) PCT Pub. No.: WO2020/090865
PCT Pub. Date: May 7, 2020

(65) Prior Publication Data
US 2021/0251219 A1    Aug. 19, 2021

(30) Foreign Application Priority Data
Oct. 31, 2018 (JP) ................................ 2018-205093

(51) Int. Cl.
*A01N 25/24* (2006.01)
*A01N 25/02* (2006.01)
*A01N 57/20* (2006.01)

(52) U.S. Cl.
CPC .............. *A01N 25/24* (2013.01); *A01N 25/02* (2013.01); *A01N 57/20* (2013.01)

(58) Field of Classification Search
CPC .......... A01P 21/00; A01P 15/00; A01N 25/02; A01N 25/30; A01N 57/20; A01N 25/22; A01N 57/12; A01N 2300/00
See application file for complete search history.

(56) References Cited

U.S. PATENT DOCUMENTS

| | | | |
|---|---|---|---|
| 6,093,679 A | 7/2000 | Azuma et al. | |
| 2007/0184982 A1 | 8/2007 | Long | |
| 2008/0045415 A1 | 2/2008 | Baur et al. | |
| 2009/0149328 A1 | 6/2009 | Suzuki et al. | |
| 2011/0230385 A1 | 9/2011 | Murphy et al. | |
| 2014/0106972 A1 | 4/2014 | Shao et al. | |
| 2015/0150251 A1* | 6/2015 | Ernenwein | C11B 9/00 514/777 |
| 2015/0181862 A1 | 7/2015 | Goyal et al. | |
| 2018/0368398 A1 | 12/2018 | Masatoshi | |
| 2019/0110469 A1 | 4/2019 | Long et al. | |

FOREIGN PATENT DOCUMENTS

| | | |
|---|---|---|
| CA | 2018580 A1 | 12/1990 |
| CA | 1333226 C | 11/1994 |
| CA | 2211200 A1 | 8/1996 |
| CN | 1180296 A | 4/1998 |
| CN | 101378655 B | 1/2013 |
| CN | 103210916 A | 7/2013 |
| CN | 103269581 A | 8/2013 |
| CN | 106689124 A | 5/2017 |
| CN | 106689191 A | 5/2017 |
| CN | 108402040 A | 8/2018 |
| JP | S61-289004 A | 12/1986 |
| JP | H01-299205 A | 12/1989 |
| JP | H03-24004 A | 2/1991 |
| JP | H10-512575 A | 12/1998 |
| JP | 2006117650 A | 5/2006 |
| JP | 2009525345 A | 7/2009 |
| JP | 2009541233 A | 11/2009 |
| JP | 2017501199 A | 1/2017 |
| WO | WO-2012086617 A1 | 6/2012 |
| WO | WO-2017104733 A1 | 6/2017 |
| WO | WO2017/196856 A1 * | 11/2017 ............. A01N 57/20 |

OTHER PUBLICATIONS

Extended European Search Report issued Jul. 4, 2022 in Patent Application No. 19880534.3, 11 pages.
Written Opinion issued Dec. 17, 2019 in PCT/JP2019/042511 (with English translation of International Preliminary Report on Patentability and Written Opinion), 11 pages.
Combined Chinese Office Action and Search Report issued Jul. 7, 2021 in Patent Application No. 201980062829.5 (with English translation of Office Action and English translation of categories), 9 pages.
International Search Report issued Dec. 17, 2019 in PCT/JP2019/042511 (with English translation).

* cited by examiner

*Primary Examiner* — Audrea B Coniglio
(74) *Attorney, Agent, or Firm* — Element IP, PLC

(57) ABSTRACT

The present invention is a herbicide composition containing the following components (A), (B) and (C), wherein a mass ratio between the content of component (B) and the content of component (C), (C)/(B), is 0.010 or more and 0.18 or less:

component (A): a compound selected from glufosinate and a salt thereof;
component (B): a compound represented by the following general formula (B-I):

$$R^1O(R^2O)_nSO_3^-M^+ \quad (B\text{-}I)$$

wherein $R^1$ is a hydrocarbon group with 8 or more and 24 or less carbons, $R^2$ is an alkanediyl group with 2 or more and 4 or less carbons, n is an average number of added moles and 0 or more and 30 or less, and $M^+$ is a counter ion; and
component (C): an aromatic sulfonate salt having an aliphatic hydrocarbon group.

7 Claims, No Drawings

HERBICIDE COMPOSITION

FIELD OF THE INVENTION

The present invention relates to a herbicide composition, a weeding method and a glufosinate efficacy enhancing agent composition.

BACKGROUND OF THE INVENTION

Glufosinate or a salt thereof, for example, an ammonium salt of glufosinate is a known amino acid-based herbicide that is absorbed through the green parts of plants, and it is considered that glutamine synthetase inhibition causes ammonia accumulation, which inhibits plant physiology to result in herbicidal activity being exhibited.

Conventionally, various compounds have been used in combination with agrochemical-containing compositions in order to bring out the full effect of agrochemicals.

JP-A H10-512575 discloses a herbicide composition consisting of an effective amount of combination of glufosinate or a salt or an analogue thereof such as bialaphos, a nitrodiphenyl ether herbicide such as oxyfluorfen, and an alkyl polyglycol ether sulfate surfactant.

JP-A H1-299205 discloses a liquid herbicidal agent containing glufosinate in combination with specific surfactants.

SUMMARY OF THE INVENTION

The present invention provides a herbicide composition using glufosinate, which is excellent in herbicidal effect.

In addition, the present invention provides a herbicide composition using glufosinate, which is excellent in herbicidal effect, productivity and formulation stability.

The present invention relates to a herbicide composition containing the following components (A), (B) and (C), wherein a mass ratio between the content of component (B) and the content of component (C), (C)/(B), is 0.010 or more and 0.18 or less:

component (A): a compound selected from glufosinate and a salt thereof;
component (B): a compound represented by the following general formula (B-I):

wherein $R^1$ is a hydrocarbon group with 8 or more and 24 or less carbons, $R^2$ is an alkanediyl group with 2 or more and 4 or less carbons, n is an average number of added moles and 0 or more and 30 or less, and $M^+$ is a counter ion; and component (C): an aromatic sulfonate salt having an aliphatic hydrocarbon group.

In addition, the present invention relates to a weeding method including spraying a herbicide spray liquid prepared from the herbicide composition of the present invention to a plant.

Moreover, the present invention relates to a glufosinate efficacy enhancing agent composition containing the above components (B) and (C), wherein a mass ratio between the content of component (B) and the content of component (C), (C)/(B), is 0.010 or more and 0.18 or less.

According to the present invention, provided is a herbicide composition using glufosinate, which is excellent in herbicidal effect.

In addition, according to the present invention, provided is a herbicide composition using glufosinate, which is excellent in herbicidal effect, productivity and formulation stability.

EMBODIMENTS OF THE INVENTION

[Herbicide Composition]

The reason why the herbicide composition of the present invention is excellent in herbicidal effect is not wholly clear, but is presumed to be as follows. The herbicidal performance of glufosinate is greatly affected by the adhesion amount of sprayed glufosinate-containing droplets, and in order to enhance the adhesion, it is important to optimize the contact area between the droplets and plants (leaves or the like) and further to increase the adhesion energy. It is presumed that, in the present invention, both high adhesion energy and optimum contact area could be achieved by using components (B) and (C) at a predetermined ratio, and as a result of the enhanced adhesion, herbicidal effect was improved.

<Component (A)>

Component (A) of the present invention is a compound selected from glufosinate and a salt thereof. Component (A) is an agrochemical active ingredient of an amino acid-based herbicide. Note that, while an exemplary glufosinate registered as an agrochemical in Japan is ammonium-DL-homo-alanine-4-yl(methyl)-phosphinate, that is, an ammonium salt compound, glufosinate as used herein refers to an acid-type compound (a compound with an acid-type phosphinic acid group).

Exemplary salts of glufosinate are an ammonium salt and a sodium salt.

In formulating the herbicide composition with component (A), an aqueous solution, a liquid agent, wettable powder or the like containing component (A) can also be used.

<Component (B)>

Component (B) of the present invention is a compound represented by the following general formula (B-I):

wherein $R^1$ is a hydrocarbon group with 8 or more and 24 or less carbons, $R^2$ is an alkanediyl group with 2 or more and 4 or less carbons, n is an average number of added moles and 0 or more and 30 or less, and $M^+$ is a counter ion.

In the general formula (B-I), $R^1$ is preferably an aliphatic hydrocarbon group, more preferably an alkyl group and further preferably a linear alkyl group. $R^1$ has 8 or more, preferably 10 or more and more preferably 12 or more carbons from the viewpoint of enhancing herbicidal effect, and preferably 16 or less and more preferably 14 or less carbons from the viewpoints of enhancing herbicidal effect and improving formulation stability.

$R^2$ has preferably 2 or more and 3 or less carbons and more preferably 2 carbons from the viewpoint of enhancing herbicidal effect. $R^2$ is preferably an ethylene group.

n is 0 or more, preferably 1 or more and more preferably 2 or more from the viewpoint of enhancing herbicidal effect, and preferably 10 or less, more preferably 5 or less and further preferably 3 or less from the viewpoints of enhancing herbicidal effect and improving formulation stability.

$M^+$ is a counter ion and examples thereof include, for example, ions of alkali metals such as sodium, potassium and the like, an ammonium ion, a triethanolammonium ion, and the like, and alkali metal ions are preferable and a sodium ion is more preferable from the viewpoints of enhanced herbicidal effect and formulation stability.

<Component (C)>

Component (C) of the present invention is an aromatic sulfonate salt having an aliphatic hydrocarbon group.

Component (C) may be an aromatic sulfonate salt having a hydrocarbon group substituted on an aromatic ring, e.g., an aliphatic hydrocarbon group.

The aliphatic hydrocarbon group of component (C) is preferably an alkyl group and more preferably a linear alkyl group from the viewpoint of enhancing herbicidal effect.

The aliphatic hydrocarbon group of component (C) has preferably 10 or more and more preferably 12 or more carbons from the viewpoint of enhancing herbicidal effect, and preferably 16 or less and more preferably 14 or less carbons from the viewpoints of enhancing herbicidal effect and improving formulation stability.

Examples of component (C) preferably include one or more compounds selected from an alkylbenzene sulfonate salt, an alkylnaphthalenesulfonate salt and an alkyl diphenyl ether disulfonate salt. The alkyl groups in these compounds are preferably linear from the viewpoint of enhancing herbicidal effect. The alkyl groups have preferably 10 or more and more preferably 12 or more carbons from the viewpoint of enhancing herbicidal effect, and preferably 16 or less and more preferably 14 or less carbons from the viewpoints of enhancing herbicidal effect and improving formulation stability.

Examples of a salt of component (C) include, for example, alkali metal salts such as a sodium salt, a potassium salt and the like, and an ammonium salt, and a sodium salt is preferable from the viewpoints of enhancing herbicidal effect and improving formulation stability.

<Composition and Others>

The herbicide composition of the present invention contains component (A) in an amount of preferably 5 mass % or more, more preferably 10 mass % or more and further preferably 15 mass % or more from the viewpoints of enhanced herbicidal effect and economic efficiency at the time of transportation or storage, and preferably 40 mass % or less, more preferably 30 mass % or less and further preferably 25 mass % or less from the viewpoints of improved formulation stability and safety. Note that, in the present invention, the content of component (A) in the composition is based on a value expressed in terms of an acid-type compound.

The herbicide composition of the present invention contains component (B) in an amount of preferably 5 mass % or more, more preferably 10 mass % or more and further preferably 15 mass % or more from the viewpoints of enhanced herbicidal effect and economic efficiency at the time of transportation or storage, and preferably 40 mass % or less, more preferably 30 mass % or less and further preferably 20 mass % or less from the viewpoints of improved formulation stability and safety. Note that, in the present invention, the content of component (B) in the composition is based on a value expressed in terms of an acid-type compound.

The herbicide composition of the present invention contains component (C) in an amount of preferably 0.1 mass % or more, more preferably 0.25 mass % or more and further preferably 0.5 mass % or more from the viewpoints of enhanced herbicidal effect and economic efficiency at the time of transportation or storage, and preferably 2.5 mass % or less, more preferably 2 mass % or less and further preferably 1.5 mass % or less from the viewpoints of enhanced herbicidal effect and formulation stability. Note that, in the present invention, the content of component (C) in the composition is based on a value expressed in terms of an acid-type compound.

In the herbicide composition of the present invention, a mass ratio between the content of component (A) and the content of component (C), (C)/(A), is preferably 0.02 or more, more preferably 0.035 or more and further preferably 0.05 or more from the viewpoint of improving herbicidal performance, and preferably 0.2 or less, more preferably 0.15 or less and further preferably 0.1 or less from the viewpoints of enhanced herbicidal effect and formulation stability.

In the herbicide composition of the present invention, a mass ratio between the content of component (B) and the content of component (C), (C)/(B), is 0.010 or more, preferably 0.025 or more and more preferably 0.050 or more from the viewpoint of enhancing herbicidal effect, and 0.18 or less, preferably 0.12 or less and more preferably 0.060 or less from the viewpoint of enhancing herbicidal effect.

In the herbicide composition of the present invention, the total content of components (B) and (C) is preferably 5 mass % or more, more preferably 7.5 mass % or more, further preferably 10 mass % or more and furthermore preferably 15 mass % or more from the viewpoints of enhanced herbicidal effect and economic efficiency at the time of transportation or storage, and preferably 40 mass % or less, more preferably 30 mass % or less, further preferably 25 mass % or less and furthermore preferably 20 mass % or less from the viewpoints of improved formulation stability and safety.

In the herbicide composition of the present invention, a mass ratio between the content of component (A) and the total content of components (B) and (C), [(B)+(C)]/(A), is preferably 0.1 or more, more preferably 0.3 or more and further preferably 0.5 or more from the viewpoint of enhancing herbicidal effect, and preferably 3 or less, more preferably 2 or less and further preferably 1.5 or less from the viewpoints of economic efficiency at the time of transportation or storage and improved formulation stability.

The herbicide composition of the present invention is preferably a liquid composition and more preferably a liquid composition containing water from the viewpoint of formulation stability. The herbicide composition of the present invention contains water in an amount of preferably 10 mass % or more, more preferably 20 mass % or more and further preferably 30 mass % or more from the viewpoint of formulation stability, and preferably 80 mass % or less, more preferably 70 mass % or less and further preferably 60 mass % or less from the viewpoint of economic efficiency at the time of transportation or storage.

As the water, tap water, distilled water, deionized water or the like can be used in such a range that does not inhibit the effect of the herbicide composition of the present invention, and deionized water is preferable from the viewpoint of stability.

The herbicide composition of the present invention can contain an agrochemical active ingredient of an existing herbicide other than component (A) (hereinafter, also referred to as component (A')).

Examples of component (A') include agrochemical active ingredients of, for example, the following herbicides: diphenyl ether herbicides such as acifluorfen, chlomethoxynil, fomesafen, lactofen, oxyfluorfen, aclonifen and the like; phenoxycarboxylic acid herbicides such as 2,4-D, clomeprop, MCPA, MCPB, MCPP and the like; dinitrophenol herbicides such as DNBP, dinoterb and the like; carbamate herbicides such as carbetamide, IPC and the like; bipyridinium herbicides such as diquat, paraquat and the like; urea herbicides such as diuron, dimefuron, ethidimuron, fenuron, metoxuron, bentazon and the like; triazine herbicides such as ametrine, atrazine, prometon, trietazine and the like; and sulfonylurea herbicides such as amidosulfuron, cinosulfuron, flazasulfron, iodosulfuron, nicosulfuron and the like, etc.

In the herbicide composition of the present invention, the content of component (A') is preferably 20 mass % or less, more preferably 15 mass % or less, further preferably 10 mass % or less and furthermore preferably 5 mass % or less, and preferably 0 mass % or more and may be 0 mass % from the viewpoints of reduction in environmental burden and safety. In the herbicide composition of the present invention, a mass ratio between the content of component (A) and the content of component (A'), (A')/(A), is preferably less than 1, more preferably 0.8 or less, further preferably 0.5 or less, furthermore preferably 0.2 or less, furthermore preferably 0.1 or less and furthermore preferably 0.05 or less, and preferably 0 or more and may be 0 from the viewpoints of reduction in environmental burden and safety.

The herbicide composition of the present invention can optionally contain compounds other than components (A) to (C), water and optional component (A'), for example, a defoamer, a surfactant, a solvent, a chelating agent, a pH adjuster, inorganic salts, a solubilizing agent, a colorant, an evaporation inhibitor, a thickener and the like.

Exemplary defoamers are a silicone-based defoamer, a polyoxyalkylene-modified hydrocarbon-based defoamer, a fluorine-based defoamer and the like, and a silicone-based defoamer is preferable from the viewpoint of defoamability. Silicone-based defoamers such as silicone oil and modified-silicone oil are more preferable, and modified-silicone oil is further preferable from the viewpoint of formulation stability. Exemplary commercially available products of silicone oil are "ANTIFOAM E-20" (manufactured by Kao Corporation) and "KF-50," "KF-73," "KF-71," "KM-7750," "KM-98," "KM-7752" and "KF-96" (all manufactured by Shin-Etsu Chemical Co., Ltd.), and "KF-7750," "KF-7752" and "KM-98" are preferable. Exemplary commercially available products of modified-silicone oil are "KF-6701" and "KS-531" (both manufactured by Shin-Etsu Chemical Co., Ltd.), and "KF-6701" is preferable. Two or more defoamers may be combined. When the herbicide composition of the present invention contains a defoamer, the content thereof is preferably 0.005 mass % or more and more preferably 0.01 mass % or more from the viewpoint of defoamability, and preferably 0.1 mass % or less and more preferably 0.05 mass % or less from the viewpoints of improved formulation stability and reduction in environmental burden. A mass ratio of the defoamer to component (B), i.e., a mass ratio of defoamer/component (B), is preferably 0.0002 or more, more preferably 0.0004 or more and further preferably 0.0008 or more from the viewpoint of defoamability, and preferably 0.01 or less, more preferably 0.008 or less and further preferably 0.003 or less from the viewpoints of formulation stability and reduction in environmental burden.

The herbicide composition of the present invention may contain a surfactant other than component (B), component (C) and the above component used as a defoamer (hereinafter, also referred to as component (D)). Examples of component (D) include an anionic surfactant, a cationic surfactant, a nonionic surfactant, an amphoteric surfactant and the like. Component (D) may be a combination of two or more.

Exemplary anionic surfactants are a dialkyl sulfosuccinate salt, an α-olefin sulfonate salt, an alkanesulfonate salt, a fatty acid salt, a polyoxyalkylene fatty acid salt and the like. One or more anionic surfactants selected from a dialkyl sulfosuccinate salt, a fatty acid salt, a polyoxyalkylene fatty acid salt and an α-olefin sulfonate salt are preferable, and one or more selected from a dialkyl sulfosuccinate salt, a fatty acid salt, a polyoxyalkylene fatty acid salt and an α-olefin sulfonate salt are more preferable. Exemplary anionic surfactant salts are alkali metal salts such as a sodium salt, a potassium salt and the like.

Exemplary nonionic surfactants are a polyoxyalkylenealkyl ether, a sorbitan fatty acid ester, a polyoxyalkylene fatty acid ester, a polyoxyalkylenealkyl amine, an alkyl (poly) glycoside and the like. Preferable nonionic surfactants are one or more selected from an alkyl (poly)glycoside and a polyoxyalkylenealkyl ether.

Exemplary amphoteric surfactants are an alkylbetaine, an alkyl (with 8 or more and 18 or less carbons) dimethyl amine oxide and the like.

Component (D) is more preferably one or more selected from an alkylbetaine, an alkyl (with 8 or more and 18 or less carbons) dimethyl amine oxide and an alkyl (poly)glycoside from the viewpoint of formulation stability.

When the herbicide composition of the present invention contains component (D), the content of component (D) is preferably 0.5 mass % or more, more preferably 1 mass % or more and further preferably 2 mass % or more from the viewpoints of enhancing herbicidal effect and enhancing the degree of freedom of formulation, and preferably 20 mass % or less, more preferably 15 mass % or less and further preferably 10 mass % or less from the viewpoints of enhanced herbicidal effect and formulation stability. In the herbicide composition of the present invention, a mass ratio of (component (B)+component (C))/component (D) is preferably 2 or more, more preferably 4 or more and further preferably 6 or more from the viewpoints of enhanced herbicidal effect and economic efficiency at the time of transportation or storage, and preferably 50 or less, more preferably 20 or less and further preferably 10 or less from the viewpoints of enhancing herbicidal effect and enhancing the degree of freedom of formulation. Note that, when component (D) is an anionic surfactant, the content of component (D) in the composition may be based on a value expressed in terms of an acid-type compound.

Suitable solvents are water-miscible solvents from the viewpoints of formulation stability and improving handleability by reducing viscosity, and examples thereof include, for example, a monohydric alcohol with 1 or more and 4 or less carbons, a polyhydric alcohol with 2 or more and 4 or less carbons and a glycol ether with 3 or more and 10 or less total carbons, and a glycol ether is preferable. Exemplary monohydric alcohols are 2-propanol, 1-butanol and the like. Exemplary polyhydric alcohols are 1,3-propanediol and the like. Exemplary glycol ethers are propylene glycol monomethyl ether, dipropylene glycol and the like, and propylene glycol monomethyl ether is more preferable. Other exemplary solvents are tetrahydrofurfuryl alcohol and the like. Two or more solvents may be combined. When the herbicide composition of the present invention contains a solvent, the composition contains the solvent in an amount of preferably 2 mass % or more, more preferably 5 mass % or more and further preferably 8 mass % or more from the viewpoint of improving formulation stability, and preferably 20 mass % or less, more preferably 15 mass % or less and further preferably 12 mass % or less from the viewpoints of enhanced herbicidal effect and economic efficiency at the time of transportation or storage. A mass ratio of the solvent to component (B), i.e., a mass ratio of solvent/component (B), is preferably 0.05 or more and more preferably 0.25 or more from the viewpoint of improving formulation stability, and preferably 2 or less and more preferably 1 or less from the viewpoint of economic efficiency at the time of transportation or storage.

The herbicide composition of the present invention may be a herbicide composition formulated with components (A), (B) and (C), wherein a mass ratio between a formulation amount of component (B) and a formulation amount of component (C), (C)/(B), is 0.010 or more and 0.18 or less. The aforementioned content of each component can be replaced with and applied as its formulation amount.

The viscosity of the herbicide composition of the present invention at 25° C. is preferably 1.0 mPa·s or more, more preferably 10 mPa·s or more and further preferably 25 mPa·s or more from the viewpoint of stability, and preferably 200 mPa·s or less and more preferably 100 mPa·s or less, and further preferably 70 mPa·s or less from the viewpoint of handleability. This viscosity is measured with a digital B-type viscometer manufactured by AMETEK Brookfield (model number: DV2T). CPA-41Z is used as a rotor, the liquid volume is 2 mL, the number of revolutions is 10 RPM and a numerical value 1 minute after the start of the measurement is taken as the viscosity.

The herbicide composition of the present invention is preferably excellent in transparency. For example, the absorbance at a wavelength of 660 nm is preferably 1.0 or less, more preferably 0.5 or less, further preferably 0.1 or less and furthermore preferably 0.05 or less. This absorbance is measured with a double beam type spectrophotometer (U-2910 manufactured by Hitachi, Ltd.). A standard disposable cell with 4 transparent surfaces manufactured by Nikko Hansen & CO., LTD. (product code 01960/00) is used as a cell and ultrapure water is used as a reference to perform the measurement.

The present invention provides use, as a herbicide, of a composition containing components (A), (B) and (C), wherein a mass ratio between the content of component (B) and the content of component (C), (C)/(B), is 0.010 or more and 0.18 or less. The aspects mentioned in the herbicide composition of the present invention can be appropriately applied to the use as a herbicide of the present invention. In the use as a herbicide of the present invention, components (A), (B), (C) and optional components and their preferable modes are the same as those mentioned in the herbicide composition of the present invention.

The present invention provides a method for producing a herbicide composition including mixing components (A), (B) and (C), wherein a mass ratio between a mixed amount of component (B) and a mixed amount of component (C), (C)/(B), is 0.010 or more and 0.18 or less. The aspects mentioned in the herbicide composition of the present invention and a glufosinate efficacy enhancing agent composition of the present invention mentioned below can be appropriately applied to the method for producing a herbicide composition of the present invention. In the method for producing a herbicide composition of the present invention, components (A), (B), (C) and optional components and their preferable modes are the same as those mentioned in the herbicide composition of the present invention and the glufosinate efficacy enhancing agent composition of the present invention. The method for producing a herbicide composition of the present invention preferably includes mixing with water.

[Weeding Method]

The present invention can provide a weeding method including spraying a herbicide spray liquid prepared from the herbicide composition of the present invention to a plant. The herbicide spray liquid is preferably prepared by adding water to the herbicide composition of the present invention.

The aspects mentioned in the herbicide composition of the present invention can be appropriately applied to the weeding method of the present invention.

In the weeding method of the present invention, the herbicide composition of the present invention is used by diluting with water in such a manner that the total content of components (A), (B) and (C) in the herbicide spray liquid is preferably 200 ppm or more, more preferably 400 ppm or more and further preferably 500 ppm or more from the viewpoint of improving herbicidal effect, and preferably 50000 ppm or less, more preferably 10000 ppm or less and further preferably 5000 ppm or less from the viewpoint of reducing environmental burden.

In the weeding method of the present invention, the herbicide spray liquid is sprayed at a proportion of preferably 0.5 L/ha or more, more preferably 50 L/ha or more, further preferably 200 L/ha or more and furthermore preferably 500 L/ha or more from the viewpoint of obtaining agrochemical efficacy, and sprayed at a proportion of preferably 2000 L/ha or less, more preferably 1500 L/ha or less, further preferably 1200 L/ha or less and furthermore preferably 1000 L/ha or less from the viewpoint of reducing environmental burden.

The weeding method of the present invention includes applying a predetermined spray liquid to weeds, which are the plants to be eradicated. In the agricultural field, weeds are recognized as herbaceous plants that grow in and around farmland and are harmful to crop production. Further, in non-agricultural fields, they are recognized, for example, as herbaceous plants that naturally grow not only in farmland but also in non-farmland such as roads, railroad tracksides, embankments, factory sites, developed land, lawns, gardens and the like, and hinder the function of the land or cause disaster prevention or landscape problems. The weeds used herein include either of these herbaceous plants. Exemplary weeds are broadleaf weeds, gramineous weeds and the like. Broadleaf weeds have reticulate leaf veins unlike weeds having linear leaves or having parallel leaf veins such as gramineous weeds.

Exemplary weeds to which the weeding method of the present invention is directed are gramineous weeds. Exemplary gramineous weeds are *Echinochloa crus-galli, Setaria viridis, Setaria pumila, Setaria viridis* f. *misera, Poa annua, Alopecurus aequalis, Eragrostis multicaulis* steud., *Digitaria violascens* Link, *Digitaria ciliaris, Eragrostis ferruginea, Dactylis glomerata* (orchard grass), *Miscanthus sinensis, Paspalum thunbergii* Kunth ex Steud., *Imperata cylindrica* (L.) P. Beauv., *Pennisetum alopecuroides, Phragmites australis* and bamboo grasses, and *Echinochloa crus-galli* is preferable from the viewpoint of agrochemical efficacy.

The weeding method of the present invention can be directed to weeds selected from broadleaf weeds and gramineous weeds. Further, the weeding method of the present invention can be directed to *Echinochloa crus-galli*.

[Glufosinate Efficacy Enhancing Agent Composition]

The present invention can provide a glufosinate efficacy enhancing agent composition containing components (B) and (C), wherein a mass ratio between the content of component (B) and the content of component (C), (C)/(B), is 0.010 or more and 0.18 or less.

Component (A) is excluded from the components with which the glufosinate efficacy enhancing agent composition of the present invention is formulated.

The herbicide composition of the present invention can be prepared by formulating the glufosinate efficacy enhancing agent composition of the present invention with component (A). That is, the method for producing a herbicide composition of the present invention can be a producing method including mixing the above glufosinate efficacy enhancing agent composition and component (A).

The aspects mentioned in the herbicide composition and weeding method of the present invention can be appropriately applied to the glufosinate efficacy enhancing agent composition of the present invention. In the glufosinate efficacy enhancing agent composition of the present invention, components (A), (B) and (C) and their preferable modes are the same as those mentioned in the herbicide composition of the present invention.

The glufosinate efficacy enhancing agent composition of the present invention contains component (B) in an amount of preferably 10 mass % or more, more preferably 20 mass % or more and further preferably 30 mass % or more from the viewpoints of improved productivity, enhanced herbicidal effect, and economic efficiency at the time of transportation or storage, and preferably 90 mass % or less, more preferably 80 mass % or less and further preferably 70 mass % or less from the viewpoint of improving formulation stability.

The glufosinate efficacy enhancing agent composition of the present invention contains component (C) in an amount of preferably 0.2 mass % or more, more preferably 0.5 mass % or more and further preferably 1 mass % or more from the viewpoints of improved productivity, enhanced herbicidal effect, and economic efficiency at the time of transportation or storage, and preferably 20 mass % or less, more preferably 10 mass % or less and further preferably 5 mass % or less from the viewpoints of enhancing herbicidal effect and improving formulation stability.

In the glufosinate efficacy enhancing agent composition of the present invention, a mass ratio between the content of component (B) and the content of component (C), (C)/(B), is 0.010 or more, preferably 0.025 or more and more preferably 0.050 or more from the viewpoint of improving productivity and the viewpoint of enhancing herbicidal effect, and 0.18 or less, preferably 0.12 or less and more preferably 0.060 or less from the same viewpoints.

In the glufosinate efficacy enhancing agent composition of the present invention, the total content of components (B) and (C) is preferably 10 mass % or more, more preferably 10.5 mass % or more, further preferably 20 mass % or more and furthermore preferably 30 mass % or more from the viewpoint of economic efficiency at the time of transportation or storage, and preferably 90 mass % or less, more preferably 80 mass % or less and further preferably 70 mass % or less from the viewpoint of improving formulation stability.

The glufosinate efficacy enhancing agent composition of the present invention may be a glufosinate efficacy enhancing agent composition formulated with components (B) and (C), wherein a mass ratio between a formulation amount of component (B) and a formulation amount of component (C), (C)/(B), is 0.010 or more and 0.18 or less. The aforementioned content of each component can be replaced with and applied as its formulation amount.

The present invention provides a method for producing a glufosinate efficacy enhancing agent composition including mixing components (B) and (C), wherein a mass ratio between a mixed amount of component (B) and a mixed amount of component (C), (C)/(B), is 0.010 or more and 0.18 or less. The aspects mentioned in the herbicide composition of the present invention and the glufosinate efficacy enhancing agent composition of the present invention can be appropriately applied to the method for producing a glufosinate efficacy enhancing agent composition of the present invention. In the method for producing a glufosinate efficacy enhancing agent composition of the present invention, components (B), (C) and optional components and their preferable modes are the same as those mentioned in the herbicide composition of the present invention and the glufosinate efficacy enhancing agent composition of the present invention. The method for producing a glufosinate efficacy enhancing agent composition of the present invention preferably includes mixing with water.

The glufosinate efficacy enhancing agent composition of the present invention may be a liquid composition from the viewpoint of ease of handling. In addition, it is preferably a liquid composition containing water.

The glufosinate efficacy enhancing agent composition of the present invention contains water in an amount of preferably 5 mass % or more, more preferably 8 mass % or more and further preferably 10 mass % or more from the viewpoint of formulation stability, and preferably 60 mass % or less, more preferably 50 mass % or less and further preferably 40 mass % or less from the viewpoint of economic efficiency at the time of transportation or storage.

As the water, tap water, distilled water, deionized water or the like can be used in such a range that does not inhibit the effect of the glufosinate efficacy enhancing agent composition of the present invention, and deionized water is preferable from the viewpoint of stability.

The glufosinate efficacy enhancing agent composition of the present invention can optionally contain compounds other than components (A) to (C) and water, for example, a defoamer, a surfactant, a solvent, a chelating agent, a pH adjuster, inorganic salts, a solubilizing agent, a colorant, an evaporation inhibitor, a thickener and the like.

When the glufosinate efficacy enhancing agent composition of the present invention is formulated with component (A), it is favorably used by formulating in such a manner that a mass ratio between a formulation amount of component (A) and a total formulation amount of components (B) and (C), [(B)+(C)]/(A), is preferably 0.1 or more, more preferably 0.3 or more and further preferably 0.5 or more from the viewpoint of enhancing herbicidal effect, and preferably 3 or less, more preferably 2 or less and further preferably 1.5 or less from the viewpoints of reducing environmental burden and improving formulation stability. That is, the method for producing a herbicide composition of the present invention preferably includes mixing component (A) and the glufosinate efficacy enhancing agent composition in such a manner that a mass ratio between the amount of component (A) and the total amount of components (B) and (C), [(B)+(C)]/(A), falls within the above range to produce the composition.

The present invention provides use, as a glufosinate efficacy enhancing agent, of a composition containing components (B) and (C), wherein a mass ratio between the content of component (B) and the content of component (C), (C)/(B), is 0.010 or more and 0.18 or less. In addition, the present invention provides application, for use in enhancing the efficacy of glufosinate, of a composition containing components (B) and (C), wherein a mass ratio between the content of component (B) and the content of component (C), (C)/(B), is 0.010 or more and 0.18 or less. The aspects mentioned in the herbicide composition, weeding method and glufosinate efficacy enhancing agent composition of the present invention can be appropriately applied to the use as a glufosinate efficacy enhancing agent and the application of the present invention. In the use as a glufosinate efficacy enhancing agent and the application of the present invention, components (B) and (C) and their preferable modes are the same as those mentioned in the herbicide composition of the present invention.

The viscosity of the glufosinate efficacy enhancing agent composition of the present invention at 25° C. is preferably 10000 mPa·s or more, more preferably 20000 mPa·s or more and further preferably 25000 mPa·s or more from the viewpoint of the stability of the composition, and preferably 100000 mPa·s or less, more preferably 80000 mPa·s or less and further preferably 50000 mPa·s or less from the viewpoint of handleability. This viscosity is measured with a digital B-type viscometer manufactured by AMETEK Brookfield (model number: DV2T). CPA-41Z is used as a rotor, the liquid volume is 2 mL, the number of revolutions is 10 RPM and a numerical value 1 minute after the start of the measurement is taken as the viscosity.

The absorbance of the glufosinate efficacy enhancing agent composition of the present invention at a wavelength of 660 nm is preferably 0.1 or more, more preferably 0.5 or more and further preferably 1.0 or more, and preferably 5.0 or less, more preferably 4.0 or less and further preferably 3.0 or less. This absorbance is measured with a double beam type spectrophotometer (U-2910 manufactured by Hitachi, Ltd.). A standard disposable cell with 4 transparent surfaces manufactured by Nikko Hansen & CO., LTD. (product code 01960/00) is used as a cell and ultrapure water is used as a reference to perform the measurement.

Examples

Formulation components used in examples and comparative examples are shown below.
<Formulation Components>
Component (A)
  A1: glufosinate ammonium salt (manufactured by FUJI-FILM Wako Pure Chemical Corporation)
Component (B)
  B1: sodium polyoxyethylene (average number of added moles 2) lauryl ether sulfate (EMAL 270J, aqueous solution with 70 mass % of active component, manufactured by Kao Corporation)
  B2: sodium polyoxyethylene (average number of added moles 3) lauryl ether sulfate (EMAL 20C, aqueous solution with 25 mass % of active component, manufactured by Kao Corporation)
Component (C)
  C1: sodium dodecyl benzene sulfonate (NEOPELEX G-25, aqueous solution with 25 mass % of active component, manufactured by Kao Corporation)
  C2: sodium dodecyl naphthalenesulfonate (aqueous solution with 50 mass % of active component)
  C3: sodium dodecyl diphenyl ether disulfonate (aqueous solution with 50 mass % of active component)
Solvent
  PM: propylene glycol monomethyl ether (Methyl Propylene Glycol, manufactured by NIPPON NYUKAZAI CO., LTD.)

Example 1 and Comparative Example 1

Herbicide compositions shown in Table 1 were prepared using the above formulation components, and evaluated for the following items. The results are shown in Table 1. The herbicide compositions in Table 1 were prepared in the usual manner. That is, components (A), (B), (C) and the solvent in formulation amounts shown in the table were added to an appropriate amount of ion exchange water and dissolved therein at room temperature (25° C.). Note that all mass percentages for the formulation components in Table 1 are numerical values based on the active components (for some components, values expressed in terms of the acid-type compounds). Further, in Table 1, "Balance" for water is the amount that makes the total composition 100 mass %.

[Method for Testing Formulation Stability 1]

10 g of each herbicide composition in Table 1 immediately after prepared was placed in a transparent glass container (20 mL in capacity) and stored for a day in a thermostatic chamber at 80° C., and then, the appearance was visually observed, and the formulation stability was judged according to the following criteria. The results are shown in Table 1. Note that, when the glufosinate ammonium salt was replaced with a glyphosate ammonium salt (manufactured by FUJIFILM Wako Pure Chemical Corporation), the composition did not become uniform under any of the conditions shown in Table 1.

Uniform: not separated into two layers and uniform
Separated: separated into two layers

[Method for Testing Herbicidal Activity 1]

*Echinochloa crus-galli* was grown in 9 cm pots and plant bodies with a grass height of about 40 cm were used for the test. 3.3 g of each herbicide composition shown in Table 1 was added to 1 L of water and uniformly stirred, thereby preparing each herbicide spray liquid. Each herbicide spray liquid prepared was foliarly sprayed on 5 pots of *Echinochloa crus-galli* at a spray volume equivalent to 25 L/10 a to cover all the plant bodies. Herbicidal activity 14 days after the foliar spraying was evaluated.

The evaluation of the herbicidal activity was visually judged, and evaluations were made with a score of 0 for the condition of an untreated pot on which no herbicide had been sprayed and 100 for the condition in which the aboveground parts of *Echinochloa crus-galli* had been completely withered up. Herbicidal effect in each pot was judged to make evaluations, and the average value of the evaluation scores is shown in Table 1. The higher the numerical value is, the higher the herbicidal efficacy is.

TABLE 1

| | | Herbicide composition | | | | | | | | | | Formulation stability 1 | Herbicidal |
|---|---|---|---|---|---|---|---|---|---|---|---|---|---|
| | | Component (A) | | Component (B) | | Component (C) | | (C)/(A) | (C)/(B) | Solvent | | | (80° C./ | activity 1 |
| | | Type | Mass % | Type | Mass % | Type | Mass % | (mass ratio) | (mass ratio) | Type | Mass % | Water | a day later) | (point) |
| Comparative | 1-1 | A1 | 18.2 | B1 | 18.8 | — | 0 | — | 0 | PM | 10 | Balance | Uniform | 78 |
| example | 1-2 | A1 | 18.2 | B1 | 14.1 | C1 | 4.7 | 0.26 | 0.33 | PM | 10 | Balance | Separated | 78 |
| | 1-3 | A1 | 18.2 | B1 | 13.1 | C1 | 5.6 | 0.31 | 0.43 | PM | 10 | Balance | Separated | 76 |

TABLE 1-continued

| | | Herbicide composition | | | | | | | | | Formulation stability 1 | Herbicidal |
| | | Component (A) | | Component (B) | | Component (C) | | (C)/(A) | (C)/(B) | Solvent | | | (80° C./ | activity 1 |
| | | Type | Mass % | Type | Mass % | Type | Mass % | (mass ratio) | (mass ratio) | Type | Mass % | Water | a day later) | (point) |
|---|---|---|---|---|---|---|---|---|---|---|---|---|---|---|
| Example | 1-1 | A1 | 18.2 | B1 | 18.3 | C1 | 0.47 | 0.026 | 0.026 | PM | 10 | Balance | Uniform | 86 |
| | 1-2 | A1 | 18,2 | B1 | 17.8 | C1 | 0.93 | 0.051 | 0.052 | PM | 10 | Balance | Uniform | 92 |
| | 1-3 | A1 | 18.2 | B2 | 17.8 | C1 | 0.93 | 0.051 | 0.052 | PM | 10 | Balance | Uniform | 90 |
| | 1-4 | A1 | 18.2 | B1 | 16.9 | C1 | 1.9 | 0.10 | 0.11 | PM | 10 | Balance | Uniform | 88 |
| | 1-5 | A1 | 18.2 | B1 | 17.8 | C2 | 0.93 | 0.051 | 0.052 | PM | 10 | Balance | Uniform | 85 |
| | 1-6 | A1 | 18.2 | B1 | 17,8 | C3 | 0.93 | 0.051 | 0.052 | PM | 10 | Balance | Uniform | 83 |
| | 1-7 | A1 | 18.2 | B1 | 13.4 | C1 | 0.70 | 0.038 | 0.052 | PM | 10 | Balance | Uniform | 83 |

When KF-6701 (modified-silicone oil, manufactured by Shin-Etsu Chemical Co., Ltd) was added as a defoamer to the herbicide compositions listed in Table 1 in the range of 0.01 mass % or more and 0.05 mass % or less, the foaming of the compositions was suppressed, and the productivity or the ease of refilling of the compositions and the ease of preparation or the handleability of the herbicide spray liquids were improved, while the herbicidal performance was maintained.

Example 2 and Comparative Example 2

Glufosinate efficacy enhancing agent compositions shown in Table 2 were prepared using the above formulation components, and evaluated for the following items. The results are shown in Table 2. The glufosinate efficacy enhancing agent compositions in Tables 2 were prepared in the usual manner. That is, components (B), (C) and the solvent in formulation amounts in the table were added to an appropriate amount of ion exchange water and dissolved therein at room temperature (25° C.). Note that all mass percentages for the formulation components in Table 2 are numerical values based on the active components (for some components, values expressed in terms of the acid-type compounds). Further, in Table 2, "Balance" for water is the amount that makes the total composition 100 mass %.

[Method for Testing Productivity]

50 g of each efficacy enhancing agent composition in Table 2, 20 g of the glufosinate ammonium salt (manufactured by FUJIFILM Wako Pure Chemical Corporation), 30 g of water and a PTFE stirrer with a length of 20 mm were placed in a 200 ml glass beaker and stirred at room temperature (25° C.) with a vial hot stirrer (model number: HSH-10VA, manufactured by AS ONE Corporation) at a stirring rate of 200 rpm. It was visually confirmed that the contents became uniformly transparent, and the time required from the start of stirring until the contents became uniformly transparent was measured. The results are shown in Table 2. Note that, when the glufosinate ammonium salt was replaced with a glyphosate ammonium salt, the contents did not become uniform under any of the conditions shown in Table 2.

[Method for Testing Formulation Stability 2]

10 g of each herbicide composition prepared as mentioned in the above method for testing productivity was placed in a transparent glass container (20 mL in capacity) and stored for a day in a thermostatic chamber at 80° C., and then, the appearance was visually observed, and the formulation stability was judged according to the following criteria. The results are shown in Table 2.

Uniform: not separated into two layers and uniform
Separated: separated into two layers

[Method for Testing Herbicidal Activity 2]

Using the herbicide compositions prepared as mentioned in the above method for testing productivity, the herbicidal activity was evaluated in the same manner as in the above method for testing herbicidal activity 1. The results are shown in Table 2.

TABLE 2

| | | Glufosinate efficacy enhancing agent composition | | | | | | | | Productivity | Formulation stability 2 | Herbicidal activity 2 |
| | | Component (B) | | Component (C) | | (C)/(B) | Solvent | | Water | | | |
| | | Type | Mass % | Type | Mass % | (mass ratio) | Type | Mass % | | (second) | (80° C./a day later) | (point) |
|---|---|---|---|---|---|---|---|---|---|---|---|---|
| Comparative example | 2-1 | B1 | 37.60 | — | 0 | 0 | PM | 10.00 | Balance | 13 | Uniform | 78 |
| | 2-2 | B1 | 28.20 | C1 | 9.40 | 0.33 | PM | 10.00 | Balance | 29 | Separated | 78 |
| | 2-3 | B1 | 26.20 | C1 | 11.20 | 0.43 | PM | 10.00 | Balance | 31 | Separated | 76 |
| Example | 2-1 | B1 | 36.60 | C1 | 0.94 | 0.026 | PM | 10.00 | Balance | 12 | Uniform | 86 |
| | 2-2 | B1 | 35.60 | C1 | 1.86 | 0.052 | PM | 10.00 | Balance | 15 | Uniform | 92 |
| | 2-3 | B1 | 33.80 | C1 | 3.80 | 0.11 | PM | 10.00 | Balance | 18 | Uniform | 88 |
| | 2-4 | B1 | 33.80 | C1 | 3.80 | 0.11 | — | — | Balance | 23 | Uniform | 88 |

The invention claimed is:

1. A herbicide composition comprising components (A), (B) and (C), wherein a mass ratio between a content of the component (B) and a content of the component (C), (C)/(B), is 0.010 or more and 0.18 or less:

component (A): a compound selected from the group consisting of glufosinate and a salt thereof, component (B): a compound represented by formula (B-I):

$$R^1O(R^2O)_nSO_3^-M^+ \quad \text{(B-I)}$$

wherein $R^1$ is a hydrocarbon group with 8 or more and 24 or less carbons, $R^2$ is an alkanediyl group with 2 or more and 4 or less carbons, n is an average number of added moles and is 0 or more and 30 or less, and $M^+$ is a counter ion; and component (C): an aromatic sulfonate salt having an aliphatic hydrocarbon group with 10 or more carbons.

2. The herbicide composition according to claim 1, wherein the component (C) is one or more compounds selected from the group consisting of an alkylbenzene sulfonate salt, an alkylnaphthalenesulfonate salt and an alkyl diphenyl ether disulfonate salt, wherein alkyl groups in said compounds have 10 or more carbons.

3. The herbicide composition according to claim 1, comprising the component (A) in an amount of 5 mass % or more and 40 mass % or less.

4. The herbicide composition according to claim 1, wherein a mass ratio between a content of the component (A) and a total content of the components (B) and (C), [(B)+(C)]/(A), is 0.1 or more and 3 or less.

5. The herbicide composition according to claim 1, wherein a mass ratio between a content of the component (A) and the content of the component (C), (C)/(A), is 0.02 or more and 0.2 or less.

6. The herbicide composition according to claim 1, wherein the mass ratio between the content of the component (B) and the content of the component (C), (C)/(B), is 0.025 or more and 0.12 or less.

7. The herbicide composition according to claim 1, wherein the component (C) is an aromatic sulfonate salt having an aliphatic hydrocarbon group with 10 or more and 16 or less carbons.

* * * * *